United States Patent
Kull et al.

(10) Patent No.: US 11,859,644 B2
(45) Date of Patent: Jan. 2, 2024

(54) PISTON ASSEMBLIES AND METHODS OF USING SAME

(71) Applicant: Stabilus GmbH, Koblenz (DE)

(72) Inventors: James T. Kull, Denver, NC (US); Patrick A. Hartman, Belmont, NC (US)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 17/913,957

(22) PCT Filed: Mar. 24, 2021

(86) PCT No.: PCT/US2021/023917
§ 371 (c)(1),
(2) Date: Sep. 23, 2022

(87) PCT Pub. No.: WO2021/195232
PCT Pub. Date: Sep. 30, 2021

(65) Prior Publication Data
US 2023/0137900 A1    May 4, 2023

Related U.S. Application Data

(60) Provisional application No. 62/994,092, filed on Mar. 24, 2020.

(51) Int. Cl.
*F15B 15/28* (2006.01)
*A01D 34/00* (2006.01)
*A01D 69/02* (2006.01)

(52) U.S. Cl.
CPC ........ *F15B 15/2861* (2013.01); *A01D 34/006* (2013.01); *A01D 69/02* (2013.01)

(58) Field of Classification Search
CPC ... F15B 15/2861; A01D 34/006; A01D 69/02; F16F 9/0218; F16F 9/3292
See application file for complete search history.

(56) References Cited

U.S. PATENT DOCUMENTS 2,316,924 A    11/1941    Whisler, Jr.
2,756,071 A    7/1956    Riva
(Continued)

FOREIGN PATENT DOCUMENTS

EP    1826455 A2    8/2007
FR    1419551        12/1965

OTHER PUBLICATIONS

European Patent Office. English translation of foreign patent document FR1419551A. Apr. 13, 2021.
(Continued)

*Primary Examiner* — Jermele M Hollington
*Assistant Examiner* — Zannatul Ferdous
(74) *Attorney, Agent, or Firm* — ASHLEY LAW FIRM P.C.; Stephen S. Ashley, Jr.

(57) ABSTRACT

A piston assembly for use in a gas spring or damper can include a piston rod partially positioned within a pressure tube, and a linear position sensing apparatus capable of tracking and determining the velocity of the piston rod. The linear position sensing apparatus can include a sensor, such as a waveguide sensor, connected to the piston rod such that the sensor moves with the piston rod. A beacon, such as a magnet, can be contained within the pressure tube and the sensor can detect the position of the beacon relative to the sensor.

3 Claims, 5 Drawing Sheets

(56) References Cited

U.S. PATENT DOCUMENTS

| | | |
|---|---|---|
| 4,340,812 A | 7/1982 | Mori |
| 4,632,228 A | 12/1986 | Oster et al. |
| 4,667,780 A | 5/1987 | Pauliukonis |
| 4,895,229 A | 1/1990 | Kato |
| 4,991,675 A | 2/1991 | Tosconi et al. |
| 5,095,581 A | 3/1992 | Sarto |
| 5,450,933 A | 9/1995 | Schuttler |
| 5,501,438 A | 3/1996 | Handke et al. |
| 5,799,759 A | 9/1998 | Koch |
| 5,855,363 A | 1/1999 | Svendsen |
| 5,896,959 A | 4/1999 | Jeffries et al. |
| 6,089,966 A | 8/2000 | Latvis, Jr. et al. |
| 6,179,100 B1 | 1/2001 | Mintgen et al. |
| 6,328,291 B1 | 12/2001 | Marzocchi et al. |
| 6,460,839 B2 | 10/2002 | Muller |
| 6,491,292 B2 | 12/2002 | Stumm et al. |
| 6,883,650 B2 | 4/2005 | Van Wonderen et al. |
| 6,935,626 B2 | 8/2005 | Champ |
| 6,942,204 B2 | 9/2005 | Wolf et al. |
| 6,978,985 B2 | 12/2005 | Lung et al. |
| 7,066,455 B2 | 6/2006 | Adoline et al. |
| 7,156,214 B2 | 1/2007 | Pradel et al. |
| 7,425,188 B2 | 9/2008 | Ercanbrack et al. |
| 7,510,175 B2 | 3/2009 | Chiu |
| 7,631,922 B2 | 12/2009 | Armstrong et al. |
| 7,975,994 B2 | 7/2011 | Born et al. |
| 7,993,070 B2 | 8/2011 | Kull et al. |
| 8,146,417 B2 | 4/2012 | Glasson et al. |
| 8,459,249 B2 | 6/2013 | Corio |
| 8,627,933 B2 | 1/2014 | Six et al. |
| 8,714,531 B2 | 5/2014 | Roma |
| 8,899,560 B2 | 12/2014 | Allen et al. |
| 9,057,546 B2 | 6/2015 | Sade |
| 9,206,873 B2 | 12/2015 | Kull et al. |
| 9,491,903 B2 * | 11/2016 | Dwyer .................... B60Q 9/00 |
| 9,598,889 B2 | 3/2017 | Lohken et al. |
| 9,829,034 B2 | 11/2017 | Armstrong et al. |
| 9,917,546 B2 | 3/2018 | Sade |
| 9,985,154 B2 | 5/2018 | Needham et al. |
| 9,995,506 B2 | 6/2018 | Doyle |
| 10,221,915 B2 | 3/2019 | Kull et al. |
| 10,648,528 B2 | 5/2020 | Kull et al. |
| 10,848,097 B1 | 11/2020 | Needham et al. |
| 10,903,782 B2 | 1/2021 | Needham et al. |
| 11,118,941 B2 | 9/2021 | Ehre |
| 11,209,337 B1 | 12/2021 | Needham et al. |
| 11,416,010 B2 | 8/2022 | Needham et al. |
| 11,422,575 B2 | 8/2022 | Needham et al. |
| 2003/0107028 A1 | 6/2003 | Martin |
| 2003/0197502 A1 | 10/2003 | Nyce et al. |
| 2004/0113341 A1 | 6/2004 | McConnell et al. |
| 2007/0068753 A1 | 3/2007 | Schmidt |
| 2009/0271998 A1 | 11/2009 | Carlen et al. |
| 2011/0278778 A1 | 11/2011 | Qattan |
| 2013/0206524 A1 | 8/2013 | Bohrer et al. |
| 2014/0077429 A1 | 3/2014 | Battery et al. |
| 2014/0338659 A1 | 11/2014 | Corio |
| 2015/0107583 A1 | 4/2015 | Doyle |
| 2018/0037251 A1 | 2/2018 | Nelson |
| 2018/0302027 A1 | 10/2018 | Betts et al. |
| 2019/0072150 A1 | 3/2019 | Kull et al. |
| 2020/0248773 A1 | 8/2020 | Chandrashekar et al. |
| 2021/0277973 A1 | 9/2021 | Kull et al. |
| 2022/0124972 A1 * | 4/2022 | Dai ........................ A01D 34/78 |

OTHER PUBLICATIONS

International Search Report for International application No. PCT/US2021/023917, dated Jun. 28, 2021.

* cited by examiner

PISTON ASSEMBLIES AND METHODS OF USING SAME

CROSS REFERENCE TO RELATED APPLICATIONS

This application is a national stage application of International Application No. PCT/US2021/023917, filed Mar. 24, 2021, which claims priority to U.S. Provisional Patent Application No. 62/994,092, filed Mar. 24, 2020, which is incorporated by reference herein.

TECHNICAL FIELD

The present invention relates to the mechanical arts, and in particular piston assemblies, such as gas springs and dampers. An embodiment of the invention comprises a piston assembly having a linear position sensing system.

BACKGROUND

Piston assemblies, such as gas springs and dampers, can aid in controlling the movement of a moveable object such as a lid, door, or vehicle hood or hatch. A typical gas spring comprises a cylinder with pressured gas acting on the cross sectional area of the rod to create an output force. Gas springs can assist in lifting loads and can help move a lid or other object to different positions. Dampers can control the motion of a lid, door, lever, gear, pedal or linkage mechanism by slowing motion of the piston rod within the damper. Existing gas springs and dampers provide only output forces or motion control.

SUMMARY

An object of the present invention is to provide a linear sensing system for use on gas springs or dampers. Another object of the present invention is to provide an apparatus that allows existing features of a gas spring or damper to function while providing accurate, non-contact position sensing via electrical output signals during extension and/or compression strokes. These and other objects of the invention can be achieved in one or more of embodiments of the invention disclosed herein.

One embodiment of the invention comprises a piston assembly comprising a linear position sensing system.

Another embodiment of the invention comprises a gas spring comprising a piston assembly comprising a linear position sensing system.

Another embodiment of the invention comprises a damping apparatus comprising a piston assembly comprising a linear position sensing system.

Another embodiment of the invention comprises a piston assembly that maintains the output forces and/or motion control while also detecting stroke position by providing electrical outputs.

Another embodiment of the invention comprises a piston assembly comprising a gas spring, and a waveguide sensor unit integrated into the gas spring, wherein the sensor transmits a signal indicating the relative position of the gas spring. This can be useful in applications in which it is important to know the position of a lid or other part connected to the gas spring. By also factoring in the time, the sensor can calculate the velocity or change in velocity of the moving part. This can also be used in combination with a linear actuator.

According to an embodiment of the invention, infinite position detection can be provided relative to the full stroke of the gas spring.

According to another embodiment of the invention, the sensor unit does not affect the normal function of the gas spring.

According to another embodiment of the invention, current corrosion protection is maintained.

According to another embodiment of the invention, the gas spring and/or sensor unit can be independently replaced.

According to another embodiment of the invention, the sensor unit maintains its position during a disruption of power input.

An embodiment of the invention comprises a piston assembly comprising a piston rod partially positioned within a rod housing and adapted for sliding movement within the housing, and a linear position sensing apparatus capable of tracking and determining the velocity of the piston rod.

According to an embodiment of the invention, a piston assembly comprises a piston rod partially positioned within a rod housing and adapted for sliding movement within the housing, and a linear position sensing apparatus. The linear position sensing apparatus comprises a position sensor connected to the piston rod whereby the sensor moves with the piston rod. A beacon is contained within the rod housing, and the position sensor can detect the position of the beacon relative to the sensor.

According to an embodiment of the invention, the beacon is a magnet. The magnet can be comprised of iron, nickel, cobalt or other suitable magnetic material.

According to an embodiment of the invention, the position sensor is a waveguide sensor.

According to an embodiment of the invention, the piston rod is comprised of a non-magnetic material.

According to an embodiment of the invention, the position sensor comprises a computing device. The computing device can be an electronic control unit.

According to an embodiment of the invention, the rod housing comprises a cylindrical tube, and an opening is formed at an end of the tube for receiving the piston rod therethrough. The piston rod has an outboard end external to the tube and an inboard end inside of the tube According to an embodiment of the invention, a sealing member is positioned within the tube adjacent the opening.

According to an embodiment of the invention, grooves can be formed on the exterior surface of the tube and the beacon can be positioned within the grooves.

According to an embodiment of the invention, a connecting rod is attached to the piston rod at the outboard end of the piston rod.

According to an embodiment of the invention, the position sensor can be contained within a sensor housing that is attached to the connecting rod.

According to an embodiment of the invention, the sensor housing can be comprised of aluminum or nylon 6/6.

Another embodiment of the invention comprises a piston assembly comprising a piston rod partially positioned within a substantially cylindrical tube and adapted for sliding movement within the tube, and a linear position sensing apparatus comprising a waveguide sensor connected to the piston rod so that the sensor moves with the piston rod. A magnet is positioned within the tube, and the waveguide sensor can detect the position of the magnet relative to the sensor.

According to an embodiment of the invention, the waveguide sensor is operatively connected to an electronic control unit and the electronic control unit can determine velocity of the piston rod using the data collected by the sensor.

According to an embodiment of the invention, the piston assembly comprises a gas spring or damper.

According to an embodiment of the invention, a mechanical spring is connected to the piston rod.

Another embodiment of the invention comprises an electric motor driven zero-turn riding lawn mower comprising a damping apparatus comprising a linear position sensing apparatus.

According to an embodiment of the invention, an electric motor driven zero-turn riding lawn mower comprises at least one steering lever operatively connected to at least one drive wheel operatively connected to a drive motor, and at least one damping apparatus operatively connected to the at least one steering lever. The damping apparatus comprises a piston rod partially positioned within a rod housing and adapted for sliding movement within the housing, and a position sensor connected to the piston rod whereby the sensor moves with the piston rod. A beacon is contained within the rod housing, wherein the position sensor collects data regarding the position of the beacon relative to the sensor. A computing device such as an electronic control unit is operatively connected to the drive motor. The electronic control unit uses the data collected by the position sensor to determine an optimum speed and direction to rotate the drive wheel and transmits instructions to the drive motor to rotate the at least one drive wheel at the optimum speed and direction.

According to an embodiment of the invention, the beacon is a magnet and the position sensor is a waveguide sensor.

Another embodiment of the invention comprises an electric pallet jack comprising a gas spring comprising linear position sensing apparatus.

According to an embodiment of the invention, an electric pallet jack comprises a gas spring comprising a piston rod partially positioned within a rod housing and adapted for sliding movement within the housing, and a position sensor connected to the piston rod whereby the sensor moves with the piston rod. A beacon is contained within the rod housing, wherein the position sensor collects data regarding the position of the beacon relative to the sensor.

Another embodiment of the invention comprises a solar tracking device comprising a damper apparatus comprising a piston rod partially positioned within a rod housing and adapted for sliding movement within the housing, and a position sensor connected to the piston rod whereby the sensor moves with the piston rod. A beacon is contained within the rod housing, wherein the position sensor detects the position of the beacon relative to the sensor.

DETAILED DESCRIPTION OF PREFERRED EMBODIMENTS

Figure 1:
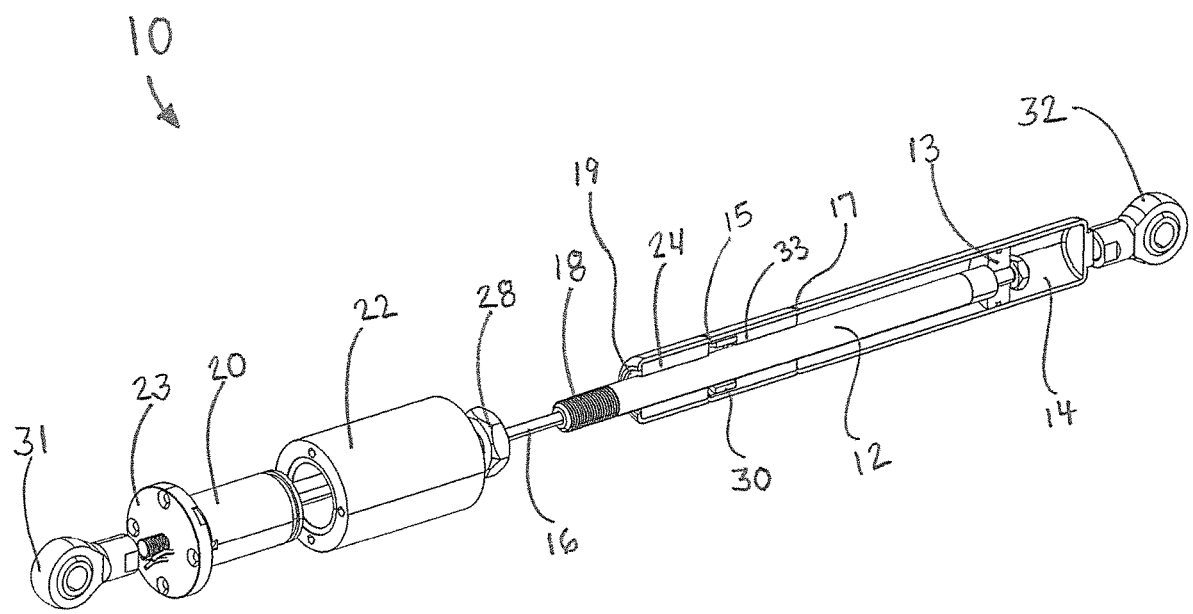
FIG. 1 is a perspective view of a piston assembly according to an embodiment of the invention, shown partially exploded and partially in cross-section.

A piston assembly according to a preferred embodiment of the invention is illustrated in FIG. 1 and shown generally at reference numeral 10. The assembly 10 comprises a piston rod 12 partially positioned within a hollow, cylindrical pressure tube 14, shown in cross-section in FIG. 1. A circular opening 19 is formed at one end of the tube 14 to allow for sliding movement of the piston rod 12 therethrough. The piston rod 12 includes a cylindrical piston head 13, shown in cross-section in FIGS. 1 and 2. The tube 14 can be a gas pressure tube made of carbon steel or other suitable material.

Figure 2:
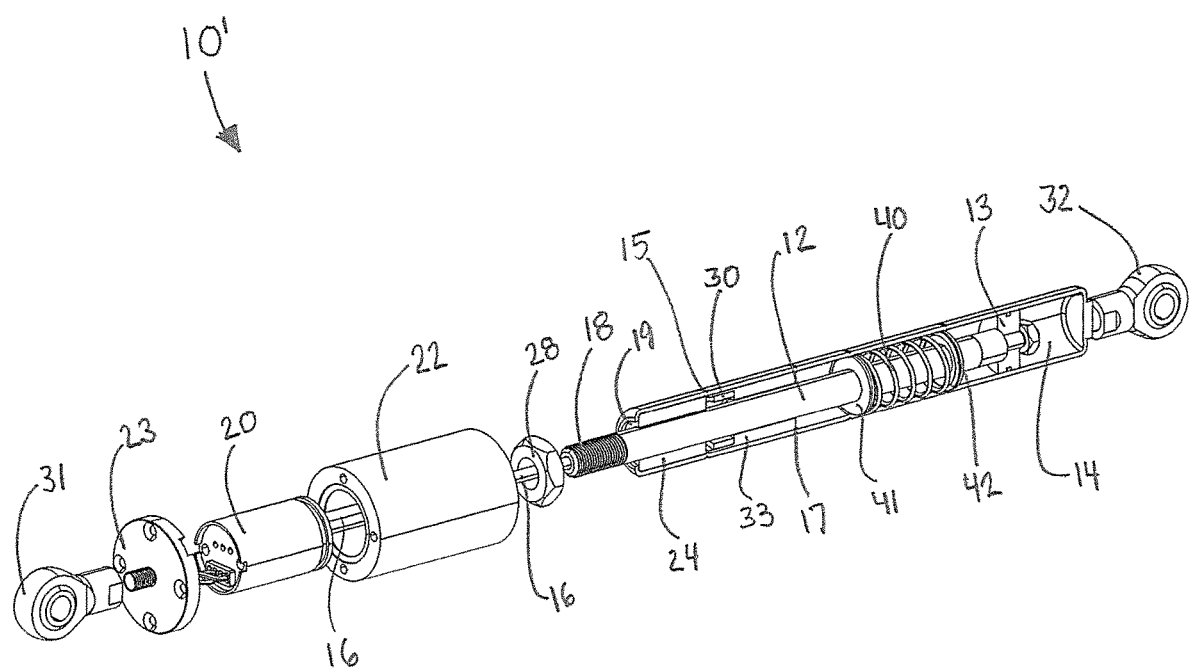
FIG. 2 is an exploded perspective view of a piston assembly according to another embodiment of the invention, shown partially exploded and partially in cross-section.

A bore is formed at the outboard end of the piston rod 12 and receives a connecting rod 16, as shown in FIG. 1. A cylindrical sealing member 24, shown in cross-section in FIGS. 1 and 2, is positioned within the pressure tube 14 adjacent the opening 19 in the tube 14 and around the rod 12 to prevent leakage of gas and/or liquid from the pressure tube 14. Threads 18 are formed on the external surface of the rod 12 at the outboard end of the rod 12, as shown in FIG. 1. A lock nut 28 engages the threads 28 on the piston rod 12. The lock nut 28 has a diameter greater than the opening in the pressure tube 14 and prevents further movement of the piston rod 12 when the lock nut 28 contacts the tube 14 during a compression stroke of the rod 12. Alternatively, a jam nut or other fastener can be used in place of the lock nut 28.

Figure 3:
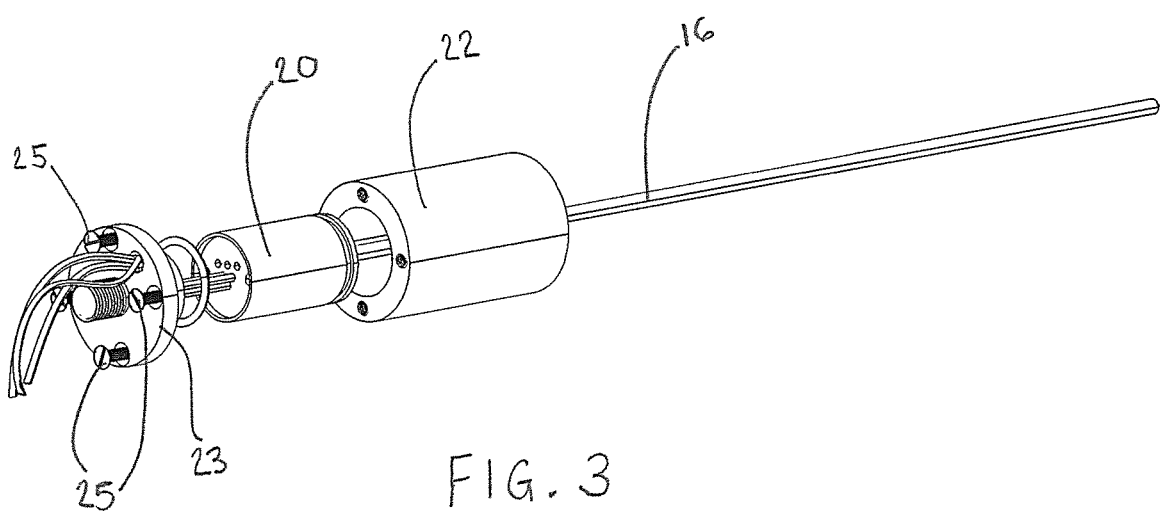
FIG. 3 is a perspective view of a portion of the piston assembly of FIG. 1.
Figure 4:
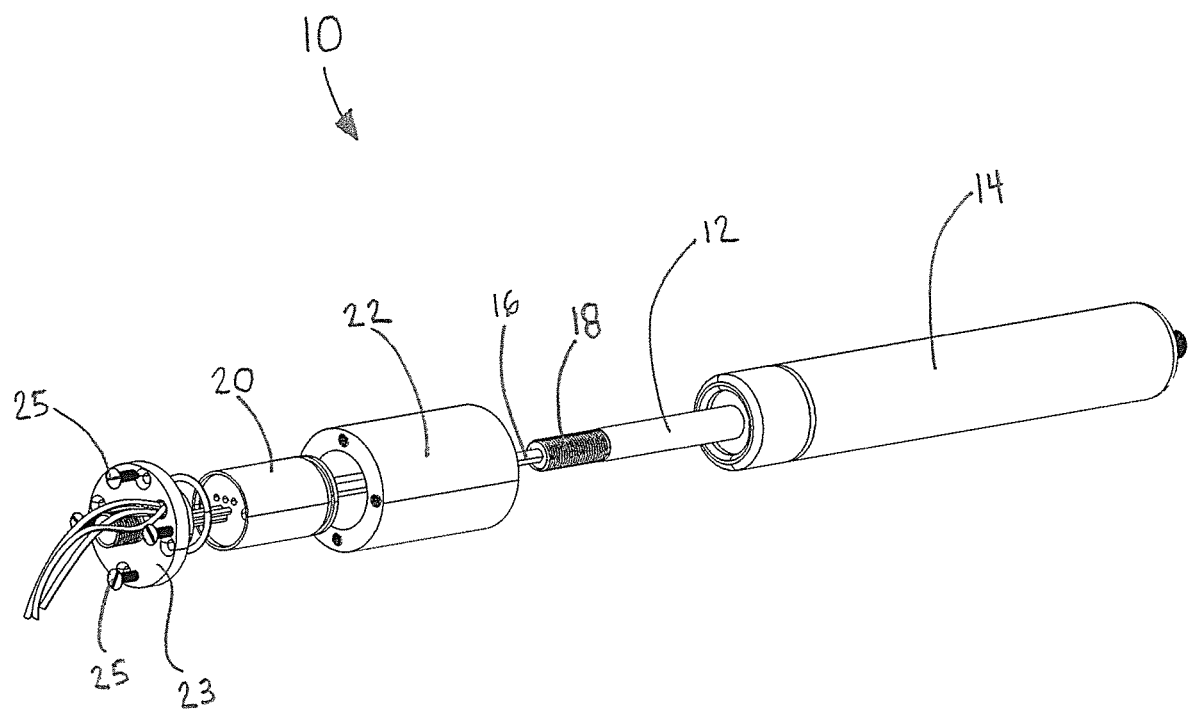
FIG. 4 is a partially exploded perspective view of the piston assembly of FIG. 1.
Figure 5:
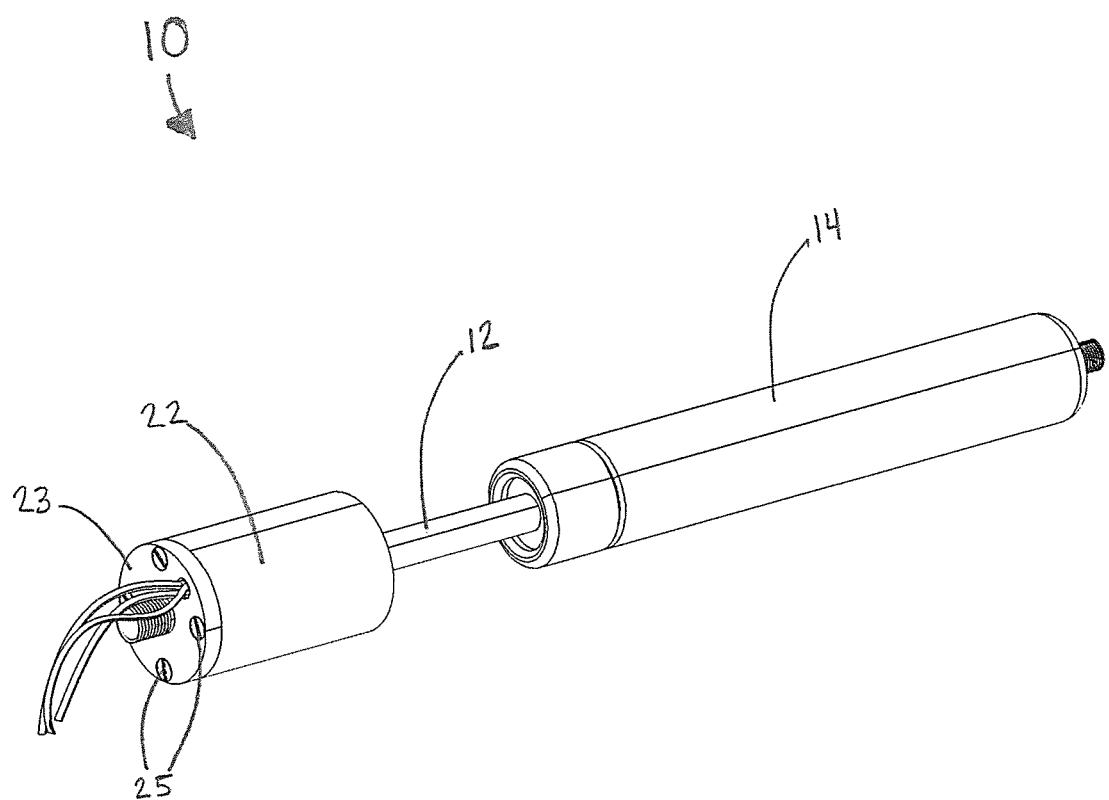
FIG. 5 is a perspective view of the piston assembly of FIG. 1.

The piston assembly 10 includes a linear position sensing system. The linear position sensing system comprises a position sensor 20. Preferably, the position sensor is a waveguide sensor. The sensor 20 is attached to the connecting rod 16 and positioned within a housing 22. The sensor housing 22 has an inner diameter greater than the outer diameter of the sensor 20 so that the sensor housing 22 can receive the sensor 20. Preferably, the sensor housing 22 is made of aluminum or nylon 6/6. A cap section 23 is attached to the housing 22 to enclose the sensor 20 within the housing 22, as shown in FIGS. 3 and 4. The cap 23 can be attached to the housing 22 with screws 25 or other suitable fasteners. The end fittings 31, 32 can be positioned at opposite ends of the piston assembly 10, as shown in FIG. 1.

A cylindrical magnet 30, shown in cross-section in FIGS. 1 and 2, is positioned inside the pressure tube 14. The magnet 30 can be comprised of iron, nickel, cobalt or other suitable magnetic material. The piston rod 12 can be comprised of a non-magnetic material, such as a non-ferrous metal or an austenitic stainless steel. Preferably, the magnet 30 is embedded in a cylindrical plastic spacer 33, shown in cross-section in FIGS. 1 and 2. The magnet 30 can be attached to the spacer 33 by an adhesive or can be overmolded into the plastic spacer 33. External grooves 15, 17 can be formed on the pressure tube 14. The magnet 30 and spacer 33 can be held in place relative to the pressure tube 14 by the grooves 15, 17.

The waveguide sensor 20 detects the position of the magnet 30 and the distance between the sensor 20 and the magnet 30. The sensor 20 is connected to the rod 12, and as the sensor 20 moves with the rod 12 the sensor 20 transmits a signal indicating the position of the rod 12 relative to the magnet 30. The sensor 20 can detect the relative position of the rod 12 without contacting the rod 12 or magnet 30.

As the rod 12 moves through extension and compression strokes, the magnetic field goes though the non-magnetic rod 12 and is detected by the sensor 20. The sensor 20 detects the relative position of the magnet 30 and gives a corresponding output signal. The position is not lost during power interruptions or movement during non-powered situations. This can be helpful in medical, off-highway, agriculture, manufacturing, processing equipment, and automobile applications, and gas springs used in conjunction with linear actuators.

A computing device, such as an electronic control unit (hereinafter "ECU") can be operatively connected to the position sensor 20. The sensor 20 detects the position of the magnet 30 and provides this position data to the ECU which can determine the relative position of the pressure tube 14 and the rod 12. During movement, the ECU can process this position data from the sensor 20 and convert it to velocity of extending or compressing to control the speed of extension/compression. The ECU can transmit this data to a receiving device that can speed up or slow down movement of the piston rod 12 in response to data transmitted by the sensor ECU.

According to an embodiment of the invention, the piston assembly 10 can be connected to a moveable part, such as a lid. The piston assembly 10 can be used to open, lift, lower and close the lid. The position sensor 20 can detect a relative distance to the magnet 30 and the time taken in moving the detected distance to calculate the velocity or change in velocity of the lid. This data can be transmitted to a receiving device that can speed up or slow down movement of the piston rod 12 in response to data transmitted by the sensor ECU.

The sensor 20 is contained within the sensor housing 22 and the magnet 30 is contained within the tube 14, as shown in FIG. 4. As such, the sensor 20 and the magnet 30 are sealed off from the external environment and are protected from contamination by dust and other debris.

According to an embodiment of the invention, the piston assembly 10 can be utilized in a gas spring. An embodiment of the invention comprises an electric pallet jack comprising a gas spring comprising the piston assembly 10. The pallet jack includes an arm that is used by the operator to steer the pallet jack. A gas spring comprising the piston assembly 10 is connected to the pallet jack arm and returns the arm to the fully upright position. The arm of the jack can be attached to the end fitting 31 of piston assembly 10, and the sensor ECU can be operatively connected to the jack arm. The position sensor 20 detects the position of the jack arm. The position of the arm controls the speed and direction of the jack. The further the arm is pushed from neutral, the faster the pallet jack moves. The position sensor 20 can replace the position sensitive throttle switch that is used to vary the speed and direction of the pallet jack in prior art pallet jacks.

A piston assembly according to another embodiment of the invention is illustrated in FIG. 2 and shown generally at reference numeral 10'. The assembly 10' comprises the same structural features of the above-described piston assembly 10, and also includes a mechanical spring 40 operatively connected to the rod 12. The spring 40 can be connected to the rod 12 via mounting members, such as a pair of e-clips 41, 42. The piston assembly 10' can be used with a self-centering damping apparatus such as is described in International Publication No. WO2020/01853, which is incorporated herein by reference. According to an embodiment of the invention, the piston assembly 10'can be used in a self-centering damper with a solar tracking device, such as the solar tracking devices described in U.S. Pat. Nos. 10,648,528 and 9,995,506, which are incorporated herein by reference.

According to an embodiment of the invention, the piston assembly 10' can be used in devices in which a mechanical system or hydraulic system is being replaced by a drive-by-wire system, such as when a gas engine powered zero-turn riding ("ZTR"lawn mower is converted to an electrical motor driven device. The dampening force or output force can simulate the feel of the mechanical system. Other uses for the piston assembly 10' include electrification for skid steer or agricultural equipment.

According to another embodiment of the invention, the piston assembly 10' can be used with self-centering dampers in zero-turn riding ("ZTR") lawn mowers having hydrostatic drive transmissions. An embodiment of the invention comprises an electric motor driven ZTR lawn mower comprising a pair of dampers, wherein each damper comprises the piston assembly 10'. Each damper is operatively connected to one of the steering levers of the mower to provide resistance to quick movements of the levers. The end fitting 31 of each damper can be attached to a lever of the mower. The ECU of the position sensor 20 is operatively connected to a drive motor of the mower. The piston rod 12 moves in unison with the steering lever. The position sensor 20 collects data regarding the position of the piston rod 12 and the steering lever. The sensor ECU uses the data to determine an optimum speed and direction to rotate the drive wheels and transmits optimum speed/direction instructions to the drive motor which rotates the drive wheels in accordance with the instructions. This helps the electric motor driven mower have the same feel as mowers having hydrostatic drive motors powered by internal combustion engines.

Piston assemblies and methods of using same are described above. Various changes can be made to the invention without departing from its scope. The above description of various embodiments of the invention are provided for the purpose of illustration only and not limitation—the invention being defined by the claims and equivalents thereof.

What is claimed is:

1. An electric motor driven zero-turn riding lawn mower comprising:
   (a) at least one steering lever operatively connected to at least one drive wheel operatively connected to a drive motor;
   (b) at least one damping apparatus operatively connected to the at least one steering lever and comprising:
      (i) a piston rod partially positioned within a rod housing and adapted for sliding movement within the housing; and
      (ii) a linear position sensing apparatus comprising a position sensor connected to the piston rod whereby the sensor moves with the piston rod, the linear position sensing apparatus further comprising a beacon contained within the rod housing and a computing device operatively connected to the position sensor and the drive motor, wherein the position sensor collects data regarding a position of the beacon relative to the sensor, and the computing device uses the data to determine an optimum speed and direction to rotate the at least one drive wheel and transmits instructions to the drive motor to rotate the at least one drive wheel at the optimum speed and direction.

2. The electric motor driven zero-turn riding lawn mower according to claim 1, wherein the position sensor comprises a waveguide sensor.

3. The electric motor driven zero-turn riding lawn mower according to claim 1, wherein the beacon comprises a magnet.

\* \* \* \* \*